US006860726B2

(12) United States Patent
Carter III et al.

(10) Patent No.: US 6,860,726 B2
(45) Date of Patent: Mar. 1, 2005

(54) DUAL DRIVE FOR HYDRAULIC PUMP AND AIR BOOST COMPRESSOR

(75) Inventors: Howard Carter III, Chesterfield, MO (US); Richard N. Johnson, Bellevue, WA (US); Michael John Provost, Bramcote Hills (GB); John David Brown, Ashbourne (GB)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/068,234

(22) Filed: Feb. 5, 2002

(65) Prior Publication Data

US 2003/0147755 A1 Aug. 7, 2003

(51) Int. Cl.[7] .............................................. F04B 17/03
(52) U.S. Cl. ...................... 417/319; 74/810.1; 417/326; 417/350
(58) Field of Search ................... 417/319, 326, 417/350, 429

(56) References Cited

U.S. PATENT DOCUMENTS

| 2,390,204 | A | * | 12/1945 | Curtis | 417/319 |
|---|---|---|---|---|---|
| 2,479,991 | A | | 8/1949 | Wood | 62/6 |
| 2,775,204 | A | * | 12/1956 | Batten et al. | 417/319 |
| 3,872,336 | A | | 3/1975 | Lin et al. | |
| 4,261,416 | A | | 4/1981 | Hamamoto | |
| 4,462,561 | A | | 7/1984 | Cronin | 244/118.5 |
| 4,546,939 | A | | 10/1985 | Cronin | 244/118.5 |
| 5,159,854 | A | * | 11/1992 | Mino et al. | 74/810.1 |
| 5,201,798 | A | | 4/1993 | Hogan | 60/39.161 |
| 5,709,103 | A | | 1/1998 | Williams | 62/402 |
| 6,023,134 | A | | 2/2000 | Carl et al. | 318/140 |
| 6,026,587 | A | * | 2/2000 | Cunkelman et al. | 417/53 |
| 6,058,715 | A | | 5/2000 | Strang et al. | 62/87 |
| 6,216,981 | B1 | | 4/2001 | Helm | 244/118.5 |

FOREIGN PATENT DOCUMENTS

| EP | 0 831 230 A2 | | 3/1998 |
|---|---|---|---|
| GB | 2083865 | * | 3/1982 |
| JP | 63162348 | | 7/1988 |

* cited by examiner

*Primary Examiner*—Michael Koczo
(74) *Attorney, Agent, or Firm*—Black Lowe & Graham, PLLC; Mark S. Beaufait

(57) ABSTRACT

A dual drive system for a hydraulic pump and an air boost compressor is provided. Reversible power is transmitted to a shaft connected to clockwise and counterclockwise overrunning clutches connected to different vehicle or equipment subsystems. Reversing the drive allows power to be alternately transmitted to one or the other of the subsystems. The invention includes utilizing the dual drive for hydraulic and air conditioning systems for an aircraft, with the provision of an additional drive motor providing constant power to one or more of the subsystems.

15 Claims, 4 Drawing Sheets

DUAL DRIVE FOR HYDRAULIC PUMP AND AIR BOOST COMPRESSOR

FIELD OF THE INVENTION

This invention relates generally to drive systems, and specifically to lightweight and efficient drive systems for aircraft subsystems, and any other vehicle with auxiliary systems.

BACKGROUND OF THE INVENTION

Bleed air from aircraft engines is commonly used to power hydraulic pumps utilized in aircraft subsystems, and especially for landing gear and flap hydraulic systems. Such pumps offer reliable, but inefficient, power transfer from bleed air into hydraulic flow and pressure. Expansion of bleed air through a turbine is limited to efficiencies between 50 to 70 percent, depending upon the bleed pressure available.

As aircraft engine designers have sought greater fuel efficiencies, engines have shifted towards higher compression ratios and higher fan bypass ratios to make the engines more fuel-efficient. However, such engines are more sensitive to bleeding air for aircraft subsystems. Thus, new airplane designs with advanced high bypass ratio engines cannot provide traditional support for engine bleed air extraction to power subsystems without a significant efficiency penalty.

This has led to the increased use of electric motor driven subsystems, often with separate motor drives. Different aircraft subsystems, including and commonly hydraulic systems and air conditioning systems, have different power requirements, with power needed in different locations of the aircraft, at different times during the flight and on the ground. Often, due to the constraints of the subsystems, different speeds and torque are required. Multiple electric motor driven subsystems provide flexibility as to location, timing of operation, and velocity. However, for aircraft, multiple electric motor driven subsystems carry the detriment of increased weight.

Therefore, an unmet need exists for drive systems for auxiliary subsystems which reduce weight and size of subsystem drives, while allowing flexible power applicability and flexible rotational velocities for the different subsystems.

SUMMARY OF THE INVENTION

The present invention provides a drive system for two aircraft subsystems from a single power source.

The dual drive system of the present invention includes at least one reversible electric motor with a double-ended output shaft connected to two over-running clutches, in turn connected to two separate subsystem components. The over-running clutches are configured to engage alternately, with one clutch engaged when the motor runs in one direction, and the other clutch engaged when the motor is reversed.

In accordance with farther aspects of the invention, the drive system is utilized in an aircraft, where one of the aircraft subsystems driven by the drive is a hydraulic pump, and the other is an air compressor. Other aspects of the invention include combining a gearing system with one or both of the over-running clutches to allow the respective subsystem components to be driven at different speeds.

In a further aspect of the invention, a second electric motor may be used to drive one of the aircraft subsystem components in addition to the reversible motor, thus providing power to that subsystem component even when the reversible motor is reversed and providing power to the alternate aircraft subsystem. The reversible motor may also have dual speeds, permitting rotation at one velocity when the motor is run in one direction and driving one aircraft subsystem, and rotation at a different velocity when the motor runs in the reverse direction driving the other subsystem.

The invention provides flexibility in powering equipment subsystems, especially aircraft hydraulic and air conditioning subsystems from a single motor, providing different output speeds for the respective subsystems from the same drive.

BRIEF DESCRIPTION OF THE DRAWINGS

The preferred and alternative embodiments of the present invention are described in detail below with reference to the following drawing.

DETAILED DESCRIPTION OF THE INVENTION

Figure 1:
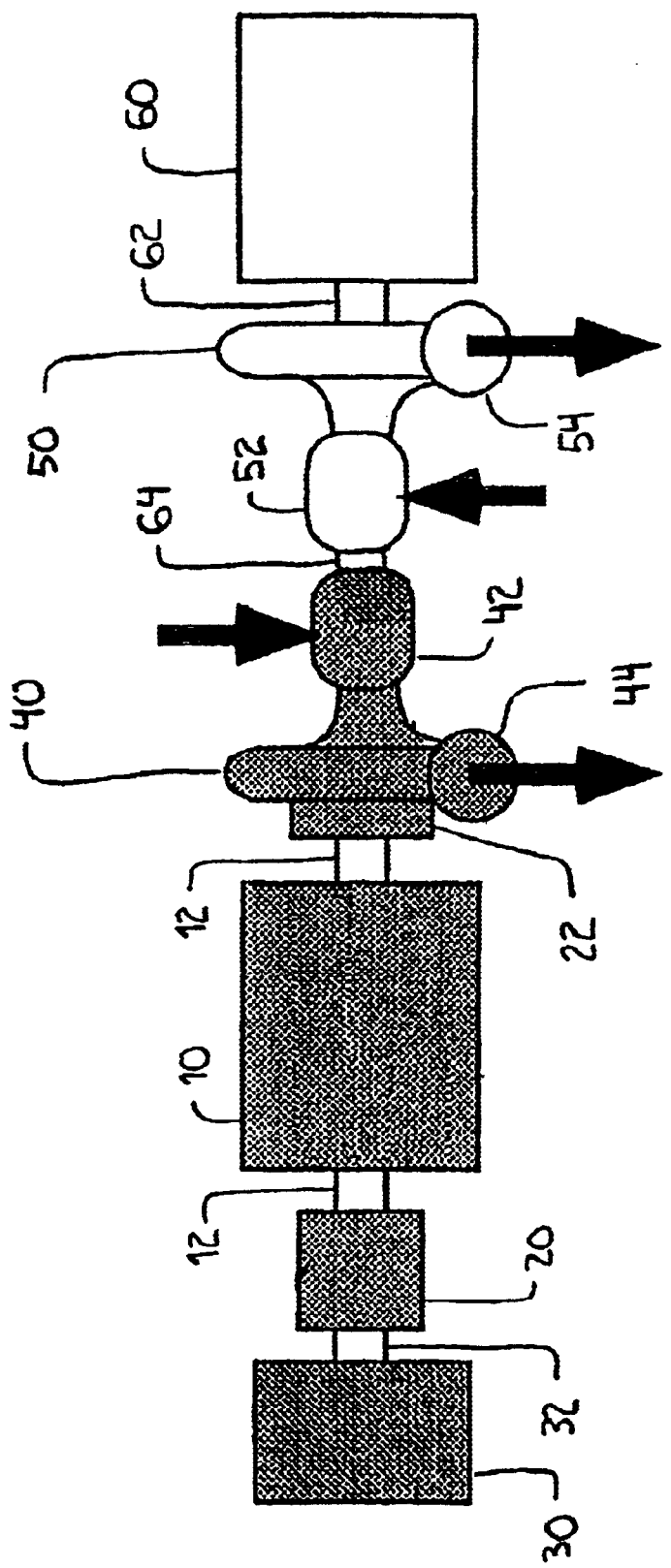
FIG. 1 is a symbolic cross section of the dual drive for hydraulic pump and air boost compressor, with a second motor drive.

FIG. 1 is a symbolic cross section of a dual drive system 5. The dual drive system 5 includes a reversible motor 10. In a presently preferred embodiment, the reversible motor is a dual speed electric motor. In an alternate embodiment, the reversible motor is a variable speed electric motor. The reversible motor 10 has a main shaft 12 with two ends. One end of the main shaft 12 is connected to a clockwise over running clutch 20, which freewheels in the clockwise direction, and engages in the counterclockwise direction. The clockwise over-running clutch has an output shaft 32. In a presently preferred embodiment, the clockwise over-running output clutch 32 is connected to and drives a hydraulic pump 30. The other end of the main shaft 12 is connected to a counter clockwise over-running clutch 22. The counter clockwise over-running clutch 22 freewheels in the counterclockwise direction and engages in the clockwise direction. In a preferred embodiment, the counterclockwise over-running clutch is connected to and drives an air compressor 40. In this embodiment, the air compressor is the first stage of a ram air compressor with a ram air inlet 42, and a ram air outlet 44. In alternate embodiments, the main shaft 12 may be an alternate driving connection, such as gear or spline outputs.

As can be seen from FIG. 1, in connection with the clockwise and counterclockwise over-running clutches, the reversible motor 10 drives the hydraulic pump 30 when the main shaft 12 rotates counterclockwise, and drives the air compressor 40 when the main shaft 12 rotates in a clockwise direction. In a presently preferred embodiment, the drive motor 10 is a dual speed reversible electric motor providing a different main shaft 12 output speed when the motor runs in a clockwise direction than when the motor runs in a counterclockwise direction. Alternately, a variable speed reversible motor would provide equivalent multi-speed function, with greater power output flexibility. Also, in a presently preferred embodiment, the clockwise over-running clutch 20 is combined with a gear system (not shown) that reduces the speed of the clockwise over-running clutch output shaft 32 driving the hydraulic pump 30. In other embodiments of the current invention, different speed and different gearing systems may be linked to the clockwise over-running clutch 20 and/or the counterclockwise over-running clutch 22. In a presently preferred embodiment, the gear system (not shown) combined with the clockwise over-running clutch 20 and driving the hydraulic pump 30 is a harmonic drive type of gear system.

FIG. 1 shows an embodiment of the present invention with a second drive motor 60. The second drive motor 60 has an output shaft 62 in line with and, through intervening components, connected to the main shaft 12 of the reversible motor 10. In a presently preferred embodiment, the second drive motor shaft 62 is connected to and drives a second stage air compressor 50. The second stage air compressor 50 has a second stage inlet 52, and a second stage outlet 54. The second stage air compressor 50 is linked by a common shaft 64 to the air compressor 40. In an alternative embodiment, the second drive motor 60 through its drive shaft 62 may be connected directly to the air compressor 40. In a presently preferred embodiment, as shown in FIG. 1, the air compressor 40, and the second stage air compressor 50 form part of an air cycle machine for air conditioning an aircraft. In a presently preferred embodiment, the common shaft 64 is a quill shaft link to the main shaft 12 through the air compressor 40.

In the embodiment shown in FIG. 1, the second drive motor 60 is a nonreversible electric motor. When operating, the second drive motor 60 provides a base level of power to the air compressors 40 and 50 even when the reversible drive motor 10 is reversed and providing power to the hydraulic pump 30. Otherwise, both the reversible drive motor 10 and the second drive motor 60 provide combined power directly to the air compressors 40 and 50 while the hydraulic pump 30 is at rest, with the clockwise over-running clutch 20 freewheeling. In a presently preferred embodiment, as shown in FIG. 1, when utilized in an aircraft, the second drive motor 60 runs constantly, providing a base level of air conditioning power through the two air compressors 40 and 50. For most of the on-ground and in-flight operational period for the aircraft, the reversible drive motor 10 provides power to the air conditioning system of the aircraft through air compressors 40 and 50. During periods when substantial hydraulic power is required, such as for raising and lowering the landing gear, or extending or retracting flaps, the reversible motor 10 is reversed, driving the hydraulic pump 30 for the limited periods of time those systems are in operation, temporarily reducing power to the aircraft air conditioning system.

In an alternative embodiment, the drive motor 10 is suitably not reversible if the clockwise over-running clutch 20 is replaced by a conventional clutch, and the counterclockwise over-running clutch 22 is similarly replaced by a conventional clutch, together with clutch controllers. The clutch controllers ensure that the appropriate clutch is engaged for the desired mode of operation and the other clutch is disengaged. That is, the clutch link to the hydraulic pump 30 is engaged when the hydraulic pump is being operated, and the clutch linked to the air compressor 40 is engaged when the air compressor is being operated. Because in most applications the hydraulic pump is operated at a different speed than the air compressor, in this configuration, the drive motor 10 is suitably a two-speed or variable speed drive motor, but need not be reversible.

In a further alternative embodiment of the present invention, the clockwise over-running clutch 20, linked to the hydraulic pump 30, is suitably omitted if a means is provided to unload the hydraulic pump 30, such as by short circuiting the hydraulic pump, when hydraulic power is not needed or additional air compression power is needed. Similarly, the counterclockwise over-running clutch 22 is suitably omitted if a means is provided to unload the air compressor 40, such as aerodynamically unloading the air compressor by opening a large air bleed. In this embodiment, when hydraulic power is needed the air compressor 40 is unloaded, directing all of the drive motor 10 power to the hydraulic pump, and vice versa. Operating the invention without clutches, but with means to unload the hydraulic pump and the air compressor does not entail a reversible motor. However, because the hydraulic pump and air compressor are usually operated at different speeds, a dual speed, multi speed, or variable speed drive motor is suitably used.

Figure 2:
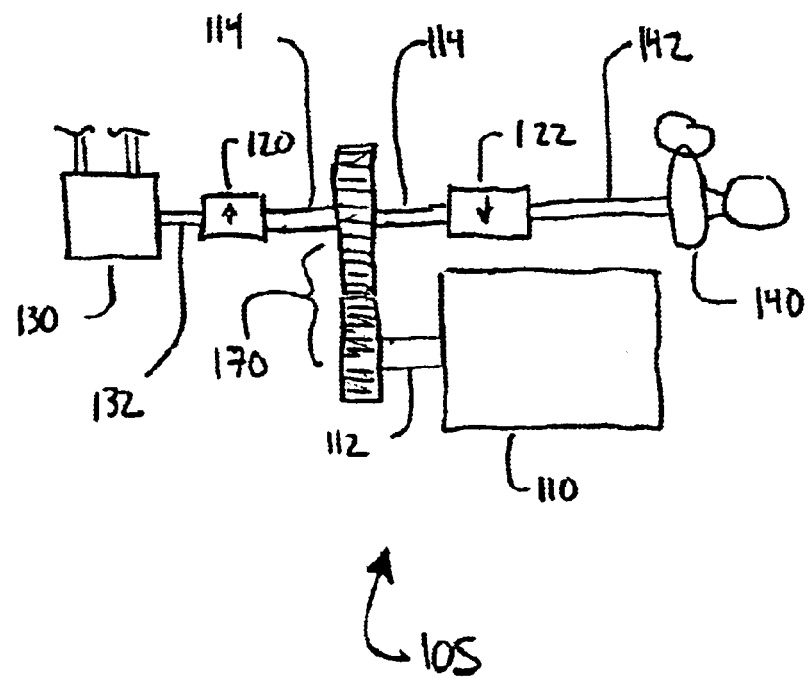
FIG. 2 is a symbolic cross-section of the dual drive for hydraulic pump and air compressor, with indirect drive.

It will be appreciated that varying configurations of the present invention suitably permit the invention to be used, for example, in confined spaces. In FIG. 2 an exemplary embodiment of the present invention includes a reversible motor 110 indirectly driving a main shaft 114. The motor 110 has a shaft 112 driving the main shaft 114 through a pair of meshing gears 170. The main shaft 114 is linked through a first overrunning clutch 120 to a shaft 132 driving a hydraulic pump 130. The main shaft 114 is also linked to a second overrunning clutch 122 linked to a second subsystem shaft 142 driving an air compressor 140. The system 105 permits flexible physical configuration of the present invention as the motor 110 driving the main shaft 114 may be positioned laterally from or at angles to the main shaft 114.

Figure 3A:
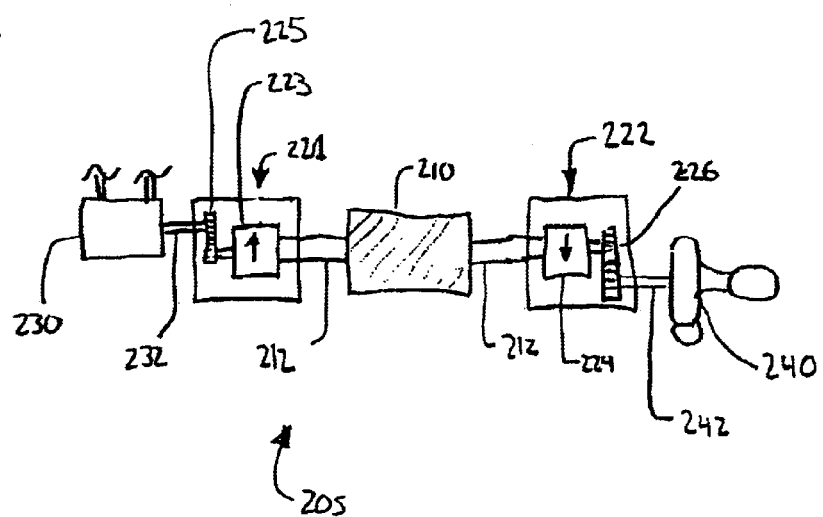
FIG. 3A is a symbolic cross-section of the dual drive for hydraulic pump and air compressor, with reduction gears.

The present invention may also incorporate gearing that changes the output speeds and torque provided to subsystems driven by the invention. In FIG. 3A an exemplary system 205 includes a reversible motor 210. The motor 210 drives a main shaft 212 projecting from two ends of the motor 210. One end of the shaft 212 drives a first overrunning clutch/gear system 221. When the motor 210 operates in a clockwise direction the first clutch/gear system 221 engages. The first clutch/gear system 221 includes an overrunning clutch 223 and a reducing gear set 225 driving a first shaft 232 driving a hydraulic pump 230.

At the opposite end of the main shaft 212, a second overrunning clutch/gear system 222 includes a second overrunning clutch 224 which engages when the main shaft 212 operates in a counter-clockwise direction. When the second overrunning clutch 224 engages it drives a second gear set 226. The second gear set 226 drives a second shaft 242 which in turn drives an air compressor 240. Thus, the system 205 suitably may provide a variety of output speeds and torques to the two subsystems driven by the system 205, in this instance a hydraulic pump 230 and an air compressor 240.

Figure 3B:
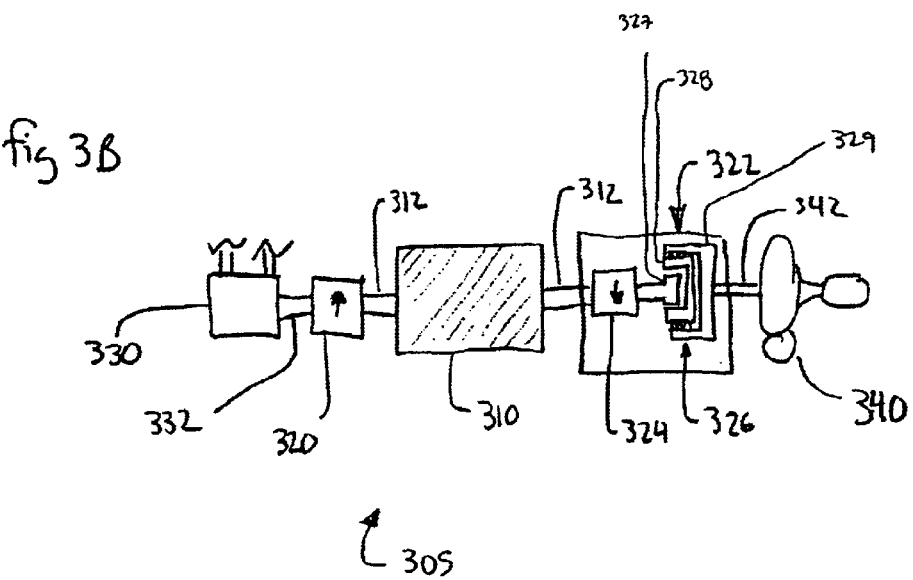
FIG. 3B is a symbolic cross-section of the dual drive for hydraulic pump and air conditioning air compressor with a harmonic drive.

It will be appreciated that harmonic drive gear sets may suitably be utilized advantageously incorporating lightweight and co-axial gearing into a system of the present invention. In FIG. 3B an exemplary system 305 of the present invention includes a reversible motor 310 driving a main shaft 312 exiting both ends of the motor 310. The main shaft 312 at one end engages an overrunning clutch 320 when the main shaft operates in a clockwise direction. The first overrunning clutch 320 when engaged then drives a first output shaft 332 driving a hydraulic pump 330.

At the opposite end of the main shaft 312 the main shaft drives an overrunning clutch/gear system 322 including a second overrunning clutch 324, and a harmonic drive 326. The second overrunning clutch 324 engages when the main shaft 312 operates in a counter-clockwise direction. When the second overrunning clutch 324 is engaged it drives the harmonic drive 326 by driving the input wave generator 327 of the harmonic drive 326. The wave generator 327 engages an intermediate flex spline 328 in a known manner, which in turn engages the circular spline or output spline 329 of the harmonic drive 326. This gears down output of the main shaft 312 to a reduced speed at the second output shaft 342 driven by the output spline 329. The second output shaft 342 in turn in this embodiment drives an air compressor 340. It will be appreciated that the harmonic drive 326 advantageously permits the main shaft 312 to be co-axial with the second output shaft 342 even as the output of the second output shaft 312 is geared down through the harmonic drive 326.

Figure 4:
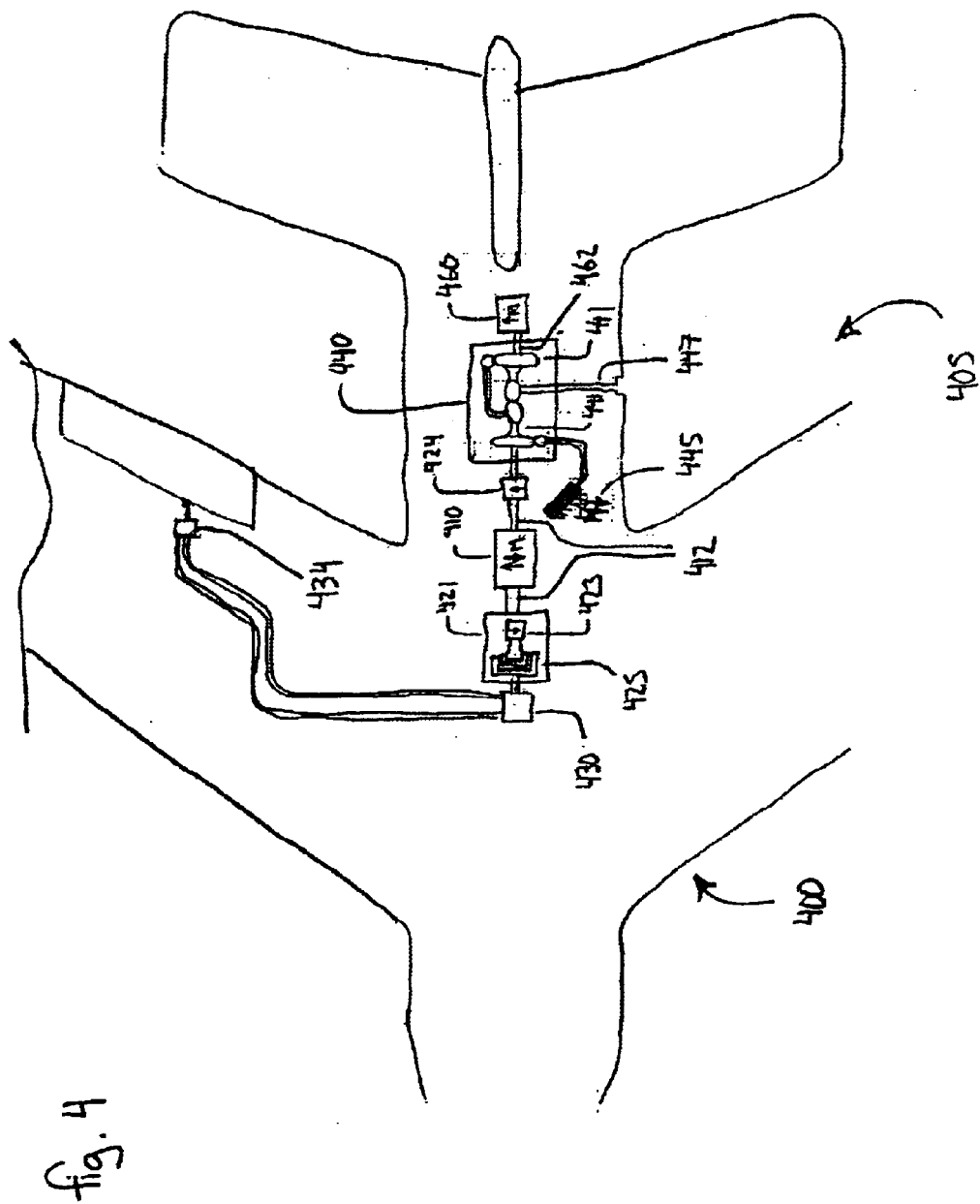
In FIG. 4 is a dual drive for hydraulic pump and air compressor incorporated in an aircraft.

The present invention can be incorporated into aircraft, thereby advantageously providing weight reduction and flexibility in driving aircraft subsystems. In FIG. 4 an exemplary system 405 of the present invention is suitably incorporated into an aircraft and drives a hydraulic pump 430 and an air cycle machine 440 for air-conditioning. The system 405 suitably includes a reversible motor 410 driving a main shaft 412 that projects from both ends of the motor 410. At one end the shaft 412 drives a first overrunning clutch/gear system 421 including a first overrunning clutch 423 that engages when the main shaft 412 rotates in a counter-clockwise direction driving a harmonic drive 425. Output from the harmonic drive 425 drives the hydraulic pump 430. Hydraulic pressure from the hydraulic pump 430 suitably may be used to drive various aircraft subsystems such as flap drive motors 434, or landing gear drive motors (not shown). At the other end the main shaft 412 connects with a second overrunning clutch 424 that engages when the main shaft 412 operates in a clockwise direction. When the second overrunning clutch 424 engages, the main shaft 412 drives an air cycle machine for air-conditioning including two air compressors 441 linked to each other to take air from an input 447, compress the air, cool the air, then re-expand the air further cooling the air, resulting in air-conditioned air output 445 for use in the aircraft 400. In this exemplary embodiment, in the manner described in connection with FIG. 1, the system 405 also includes a second single direction motor 460 also linked to the air cycle machine for air cooling 410. The second motor 460 drives the air cycle machine 440 through a second input shaft 462 co-axial with the main shaft 412 as described above in reference to FIG. 1. The second motor 460 suitably may power the air cycle machine for air-conditioning 440 even when the reversible motor 410 is operating in an opposite direction driving the hydraulic pump 430.

While the preferred embodiment of the invention has been illustrated and described, as noted above, many changes can be made without departing from the spirit and scope of the invention. For example, the invention system is not limited to aircraft subsystems. It may be utilized in other vehicle or equipment applications where lightweight, simplicity, and size limitations are important. Systems other than hydraulic and air conditioning systems may be run by the dual drive. Different gearing systems may be utilized between the drive source and the shaft connecting to the over-running clutches.

Rotational power may be provided indirectly, rather than directly from a motor. The freewheeling and engaging directions of the clutches may be reversed. A variable speed motor with a power electronics motor speed controller would allow the output of the air compressor and the hydraulic pump, alternatively, to be infinitely variable and controllable. Accordingly, the scope of the invention is not limited by the disclosure of the preferred embodiment. Instead, the invention should be determined entirely by reference to the claims that follow.

What is claimed is:

1. A dual drive system for providing power to two subsystems, the dual drive system comprising:
    a dual-speed reversible electric motor, having a main shaft with a longitudinal main shaft axis, a first end, and a second end;
    a first over-running clutch assembly having a first output shaft, a first output speed, and having a free-wheeling rotational direction, the first over-running clutch assembly being connected to and driven by the first end of the main shaft;
    a second over-running clutch assembly having a second output shaft, a second output speed, and an opposite free-wheeling rotational direction, the second over-running clutch assembly being connected to and driven by the second end of the main shaft;
    a first subsystem, connected to and driven by the first output shaft; and
    a second subsystem, connected to and driven by the second output shaft.

2. The system of claim 1, wherein the first over-running clutch assembly further includes a gear system arranged to one of reduce and increase the first output speed.

3. The system of claim 1, wherein the second over-running clutch assembly further includes a second gear system arranged to one of reduce and increase the second output speed.

4. A dual drive system for providing power to two subsystems, the dual drive system comprising:
    a reversible drive power source, having a main shaft with a longitudinal main shaft axis, a first end, and a second end;
    a first over-running clutch assembly having a first output shaft, a first output speed, and having a free-wheeling rotational direction, the first over-running clutch assembly being connected to and driven by the first end of the main shaft;
    a second over-running clutch assembly having a second output shaft, a second output speed, and an opposite free-wheeling rotational direction, the second over-running clutch assembly being connected to and driven by the second end of the main shaft;
    a first subsystem, connected to and driven by the first output shaft;
    a second subsystem, connected to and driven by the second output shaft; and
    a second drive power source, having a drive shaft with a longitudinal drive axis, arranged so that the drive shaft of the second drive power source is connected to and drives the second subsystem.

5. The system of claim 4, wherein the second drive power source is a single speed non-reversible electric motor.

6. The system of claim 4, wherein the longitudinal drive axis of the drive shaft of the second drive power source is aligned co-linear with the longitudinal main shaft axis of the main shaft of the reversible drive power source.

7. A dual drive system for providing power to two aircraft subsystems, the dual drive system comprising:
- a reversible drive power source incorporated in an aircraft, having a main shaft with a longitudinal main shaft axis, a first end, and a second end;
- a first over-running clutch assembly having a first output shaft, a first output speed, and having a free-wheeling rotational direction, the first over-running clutch assembly being connected to and driven by the first end of the main shaft;
- a second over-running clutch assembly having a second output shaft, a second output speed, and an opposite free-wheeling rotational direction, the second over-running clutch assembly being connected to and driven by the second end of the main shaft;
- a hydraulic pump, connected to and driven by the first output shaft; and
- an air compressor connected to and driven by the second output shaft.

8. The system of claim 7, wherein the reversible drive power source is a dual-speed reversible electric motor.

9. The system of claim 7, wherein the first over-running clutch assembly further comprises a gear system arranged to reduce or increase the first output speed.

10. The system of claim 9, wherein the gear system comprises a harmonic drive gear set.

11. The system of claim 7, wherein the second over-running clutch assembly further comprises a second gear system arranged to reduce or increase the second output speed.

12. The system of claim 7, wherein the air compressor is an air cycle machine arranged for air-cooling.

13. The system of claim 12, further comprising:
- a second drive power source, having a drive shaft with a longitudinal drive axis, arranged so that the drive shaft of the second drive power source is connected to and drives the air compressor.

14. The system of claim 13, wherein the second drive power source is a single speed non-reversible electric motor with its longitudinal drive axis aligned co-linear with the longitudinal main shaft axis of the main shaft of the reversible drive power source.

15. A dual drive system for providing power to two subsystems, the dual drive system comprising:
- a reversible drive power source, having a main shaft with a longitudinal main shaft axis, a first end, and a second end;
- a first over-running clutch assembly having a first output shaft, a first output speed, a harmonic drive gear set arranged to reduce or increase the first output speed, and having a free-wheeling rotational direction, the first over-running clutch assembly being connected to and driven by the first end of the main shaft;
- a second over-running clutch assembly having a second output shaft, a second output speed, and an opposite free-wheeling rotational direction, the second over-running clutch assembly being connected to and driven by the second end of the main shaft;
- a first subsystem, connected to and driven by the first output shaft; and
- a second subsystem, connected to and driven by the second output shaft.

* * * * *

UNITED STATES PATENT AND TRADEMARK OFFICE
CERTIFICATE OF CORRECTION

PATENT NO. : 6,860,726 B2
DATED : March 1, 2005
INVENTOR(S) : Carter, III et al.

It is certified that error appears in the above-identified patent and that said Letters Patent is hereby corrected as shown below:

<u>Title page,</u>
Item [73], Assignee, add:
-- Rolls-Royce plc
65 Buckingham Gate
London, SW1E 6AT
ENGLAND --.

Signed and Sealed this

Seventh Day of March, 2006

JON W. DUDAS
*Director of the United States Patent and Trademark Office*